United States Patent [19]

Powers

[11] 4,125,388
[45] Nov. 14, 1978

[54] METHOD OF MAKING OPTICAL WAVEGUIDES

[75] Inventor: Dale R. Powers, Painted Post, N.Y.

[73] Assignee: Corning Glass Works, Corning, N.Y.

[21] Appl. No.: 877,514

[22] Filed: Feb. 13, 1978

Related U.S. Application Data

[63] Continuation of Ser. No. 752,464, Dec. 20, 1976, abandoned.

[51] Int. Cl.² .............................................. C03B 37/02
[52] U.S. Cl. ......................................... 65/3 A; 65/13; 65/18; 65/30 R; 65/32; 65/DIG. 7
[58] Field of Search .......... 65/3 A, 2, 13, 18, DIG. 7; 34/21, 104

[56] References Cited

U.S. PATENT DOCUMENTS 2,316,900  4/1943  Taylor ................................... 34/104
3,993,454  1/1976  De Luca ............................. 65/18 X

FOREIGN PATENT DOCUMENTS 121,767  6/1944  Australia ...................................... 34/21

Primary Examiner—Robert L. Lindsay, Jr.
Attorney, Agent, or Firm—William J. Simmons, Jr.; Walter S. Zebrowski

[57] ABSTRACT

A method of making low loss glass optical waveguides, wherein at least one coating of glass soot is deposited by the flame hydrolysis process on a starting member. The starting member is removed from the coating material or glass soot preform leaving an aperture therein, and a tube is secured to one end of the preform. While the preform is heated to its consolidation termperature, an atmosphere including a drying agent flows from the tube into the aperture and through the porous preform, thereby removing water from the preform while the soot is consolidated to form a dense glass article. The tube can be removed, and the resultant dense glass article can be drawn into an optical waveguide fiber.

15 Claims, 4 Drawing Figures

METHOD OF MAKING OPTICAL WAVEGUIDES

CROSS-REFERENCE TO RELATED APPLICATION

This is a continuation of application Ser. No. 752,464 filed Dec. 20, 1976 now abandoned.

BACKGROUND OF THE INVENTION

1. Field of the Invention

This invention relates to a method of forming, by the flame hydrolysis technique, high optical purity blanks from which high quality optical waveguides, lenses, prisms and the like can be made. This invention is particularly applicable to optical waveguides which must be formed from extremely pure materials.

Optical waveguides, which are the most promising medium for transmission of signals around $10^{15}$ Hz, normally consist of an optical fiber having a transparent core surrounded by transparent cladding material having a refractive index lower than that of the core.

The stringent optical requirements placed on the transmission medium to be employed in optical communication systems has negated the use of conventional glass fiber optics, since attenuation therein due to both scattering and impurity absorption is much too high. Thus, unique methods had to be developed for preparing very high purity glasses in fiber optic form. Glass preparation techniques which have shown much promise are based on the flame hydrolysis process which employs vapor phase reaction of high purity vapors. This approach to the formation of low loss optical waveguides is based on methods described in U.S. Pat. Nos. 2,272,342 and 2,326,059 issued to J. F. Hyde and M. E. Nordberg, respectively. The flame hydrolysis technique has been employed to prepare single mode waveguides and multimode waveguides of both the step-index and graded-index type. Various methods employing the flame hydrolysis technique for forming glass optical waveguide fibers are taught in U.S. Pat. Nos. 3,737,292; 3,823,995 and 3,884,550.

The usefulness of glass optical waveguides in optical transmission systems depends upon the attainment of very low loss transmission over the entire wavelength range of about 700–1100 nm. This can be achieved by reducing attenuation due to optical scattering and absorption to a level which approaches the minimum theoretically attainable level. Waveguides in which at least 80% of the scattering loss can be accounted for by intrinsic glass scattering have been made by the aforementioned flame hydrolysis technique. However, due to the presence of residual water produced by this technique, absorption losses between 700 nm and 1100 nm have been excessively large. By residual water in glass is meant that the glass contains a high level of OH, $H_2$ and $H_2O$. One explanation of residual water may be found in U.S. Pat. No. 3,531,271 to W. H. Dumbaugh, Jr. The maximum attenuation in the aforementioned wavelength range that is attributable to residual water occurs at about 950 nm. The remaining portion of the attenuation at 950 nm, which is due to factors such as intrinsic material scattering, amounts to about 3 dB/km. For example, a glass optical waveguide having an attenuation less than 6 dB/km at 800 nm may have an attenuation greater than 100 dB/km at 950 nm due to the presence of water therein. To be useful in optical communication systems, optical waveguide attenuation is preferably less than 10 dB/km at the wavelength of light being propagated therein. In order to achieve such low attenuation over the entire range between 700 nm and 1100 nm, a glass waveguide fiber must be rendered substantially water-free, i.e., the amount of residual water within the fiber must be reduced to a level of less than 10 ppm.

2. Description of the Prior Art

Since it is impossible to reduce the water content to acceptable levels after flame hydrolysis-produced soot has been consolidated to form a solid glass coating, the water must be removed before or during the consolidation process. Heretofore, various methods were employed to reduce the water content in optical waveguides produced by flame hydrolysis. Such disadvantages as long processing times, equipment problems and incomplete water removal were encountered.

One prior art method that has been very effective in reducing the water content in fused silica produced by the flame hydrolysis process is disclosed in U.S. Pat. No. 3,933,454. In accordance with that patent a soot preform produced by the flame hydrolysis process is consolidated by inserting it into a consolidation furnace wherein the soot preform is heated to a temperature within the consolidation temperature range for a time sufficient to cause the soot particles to fuse and form a dense glass layer. The soot preform is simultaneously subjected to a stream of a substantially dry chlorine containing gas which flows through the furnace. The chlorine permeates the interstices of the soot preform during the consolidation thereof and replaces hydroxyl ions by chlorine ions, thereby resulting in a glass article that is substantially water-free. However, prior to making contact with the soot preform, the chlorine containing gas can react with the walls of the consolidation furnace to produce volatile compounds such as iron chlorides which can then contaminate the preform. Thus, while the resultant glass article exhibits very little excess attenuation at 950 nm due to water absorption, the overall attenuation thereof across the entire visible spectrum is increased due to impurities transported by the drying gas.

SUMMARY OF THE INVENTION

It is therefore an object of the present invention to provide an effective and economical method of removing residual water from a flame hydrolysis-deposited glass soot preform during the consolidation process. A further object is to provide a method of forming optical waveguides having extremely low concentrations of water and contaminants.

Briefly, the present invention relates to an improved method of forming a glass article by the flame hydrolysis process. This process conventionally comprises the steps of depositing on a starting member a coating of flame hydrolysis-produced glass soot to form a soot preform and consolidating the soot preform to form a dense glass layer. The consolidation step conventionally comprises subjecting the soot preform to a temperature in the consolidation temperature range, for a time sufficient to permit the soot particles to fuse and consolidate, thereby forming a dense glass layer which is free from particle boundaries. It is also conventional to subject the preform to an atmosphere such as helium, oxygen, argon, neon or mixtures of these gases, or even to a reduced pressure for the purpose of removing gases from the preform interstices during consolidation to thereby reduce the number of seeds in the resultant glass article. In connection with the fusing of glass soot particles formed by flame hydrolysis, this process is sometimes referred to as sintering even though no particle boundaries remain.

In accordance with the present invention, the step of consolidating is characterized in that it comprises disposing the preform in a furnace wherein it is subjected to a temperature within the consolidation temperature range for a time sufficient to cause the soot particles to fuse and form a dense glass layer. Simultaneously, a stream of an atmosphere containing a drying agent is flowed through the interstices of the porous soot preform, that portion of the stream which contacts the furnace being prevented from thereafter contacting the preform.

In accordance with a preferred embodiment of this invention the starting member is removed prior to the consolidation step. During the consolidation process, the stream which contains the drying agent is flowed into the aperture formed by removal of the starting member. The stream thereafter flows outwardly from the center of the preform through the interstices therein to the outer surface thereof.

DETAILED DESCRIPTION OF THE INVENTION

It is to be noted that the drawings are illustrative and symbolic of the present invention and there is no intention to indicate the scale or relative proportions of the elements shown therein. For the purposes of simplicity, the present invention will be substantially described in connection with the formation of a low loss optical waveguide although this invention is not intended to be limited thereto.

Figure 1:
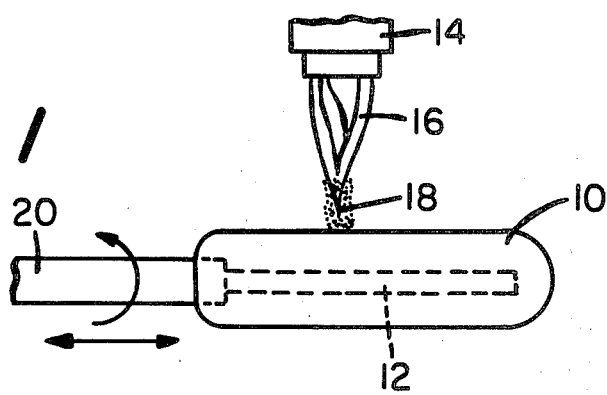
FIGS. 1 and 2 illustrate the application of first and second coatings of glass soot to a starting member.

Referring to FIG. 1, a coating 10 of glass soot is applied to a substantially cylindrical starting member such as a tube or rod 12 by means of flame hydrolysis burner 14. Fuel gas and oxygen or air are supplied to burner 14 from a source not shown. This mixture is burned to produce flame 16 which is emitted from the burner. The vapor of a hydrolyzable compound is introduced into flame 16, and the gas-vapor mixture is hydrolyzed within the flame to form a glass soot that leaves flame 16 in a stream 18 which is directed toward starting member 12. The flame hydrolysis method of forming a coating of glass soot is described in greater detail in the aforementioned U.S. Pat. Nos. 3,737,292; 3,823,995 and 3,884,550. Starting member 12 is supported by means of support portion 20 and is rotated and translated as indicated by the arrows adjacent thereto in FIG. 1 for uniform deposition of the soot. It is to be understood that an elongated ribbon burner, not shown, that provides a long stream of soot could be used in place of the substantially concentric burner illustrated in FIG. 1 whereby starting member 12 would only have to be rotated. Further, a plurality of burners 14 could be employed in a row to similarly require only rotation.

Figure 2:
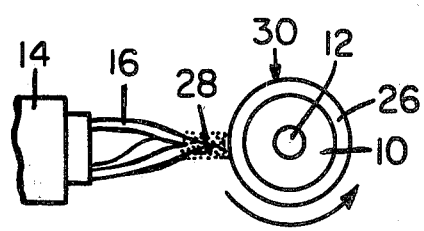

To form a step-index optical waveguide, a second coating 26 of glass soot may be applied over the outside peripheral surface of first coating 10 as shown in FIG. 2. To form a gradient index fiber, a plurality of layers of glass soot are applied to the starting member, each layer having a progressively lower index of refraction as taught in U.S. Pat. No. 3,823,995.

In accordance with well known practice the refractive index of coating 26 is made lower than that of coating 10 by changing the composition of the soot being produced in flame 16. This can be accomplished by changing the concentration or type of dopant material being introduced into the flame, or by omitting the dopant material. Support member 20 is again rotated and translated to provide a uniform deposition of coating 26, the composite structure including first coating 10 and second coating 26 constituting an optical waveguide preform 30.

Since glass starting member 12 is ultimately removed, the material of member 12 need only be such as to have a composition and coefficient of expansion compatible with the material of layer 10. A suitable material may be a normally produced glass having a composition similar to that of the layer 10 material although it does not need the high purity thereof. It may be normally produced glass having ordinary or even an excessive level of impurity or entrapped gas that would otherwise render it unsuitable for effective light propagation. The starting member may also be formed of graphite, low expansion glass or the like.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, phosphorus oxide and germanium oxide. Optical waveguides can also be made by forming the core from one or more of the aforementioned dopant oxides, the cladding being made from one or more materials having a lower refractive index. For example, a core made of pure germanium oxide may be surrounded by a cladding layer of fused silica and germanium oxide.

Figure 3:
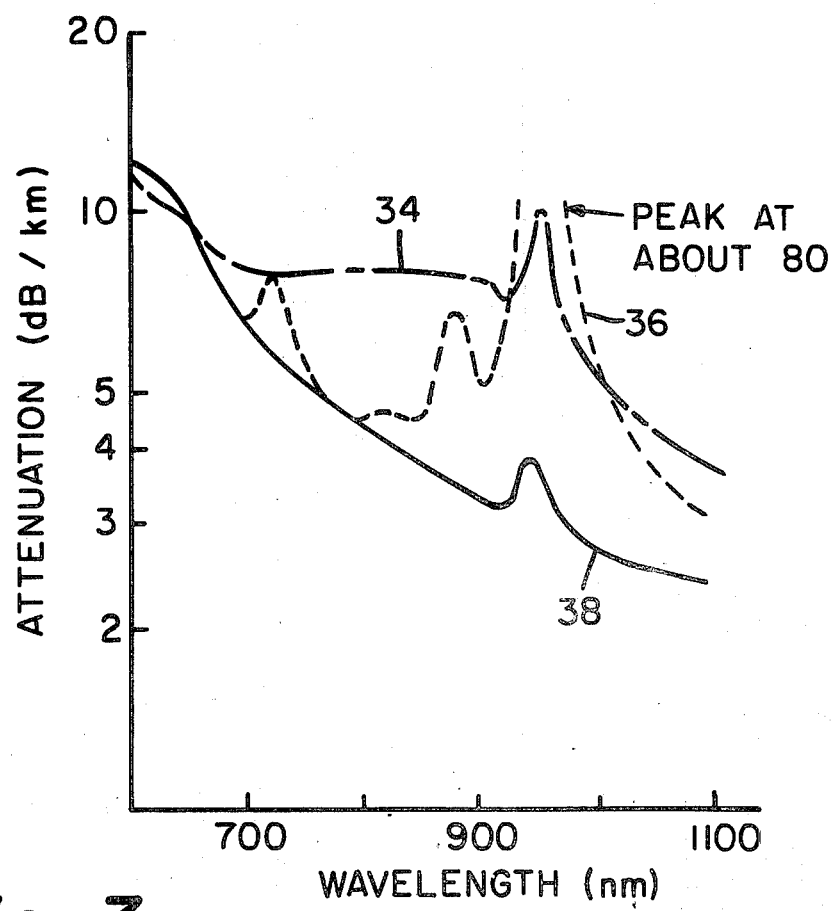
FIG. 3 is a graph which shows the attenuation curves of a plurality of optical waveguide fibers.

The flame hydrolysis technique results in the formation of glasses having extremely low losses due to scattering and impurity adsorption. Optical waveguides made by this technique have exhibited total losses as low as 1.1 dB/km at 1,060 nm. However, even when optical waveguides are formed of glasses having such high optical quality, light attenuation at certain regions of the wavelength spectrum may be so great as to preclude the use of such waveguides for the propagation of light in those regions. For example, an optical waveguide having a core of 81 wt.% $SiO_2$, 16 wt.% $GeO_2$ and 3 wt.% $B_2O_3$ and a cladding of 86 wt.% $SiO_2$ and 14 wt.% $B_2O_3$ was made by the flame hydrolysis process, no attempt being made to remove water therefrom. Attenuation curve 36 for this fiber is illustrated in FIG. 3. Water was responsible for such an excessive attenuation in the 700-1100 nm region that the waveguide was useless for the propagation of optical signals at most wavelengths within that region. At 950 nm the attenuation was about 80 dB/km. Various oxides from which such glass optical waveguides are formed, especially $SiO_2$, have a great affinity for water. However, after such glass waveguides are completely formed, the inner, light propagating portion thereof is inaccessible to water. The tendency of these glasses to absorb water is not detrimental to water-free glass optical waveguides after they are formed since most of the light energy is propagated in and around the core, and the presence of water on the outer surface has a negligible effect on the propagation of such energy. However, in the formation of optical waveguides by flame hydrolysis, residual water, which is produced by the flame, appears throughout those portions of the waveguide that have been produced by flame hydrolysis. Also, water is readily adsorbed by the soot during handling in air prior to the consolidation process because of the extremely high porosity thereof.

Figure 4:
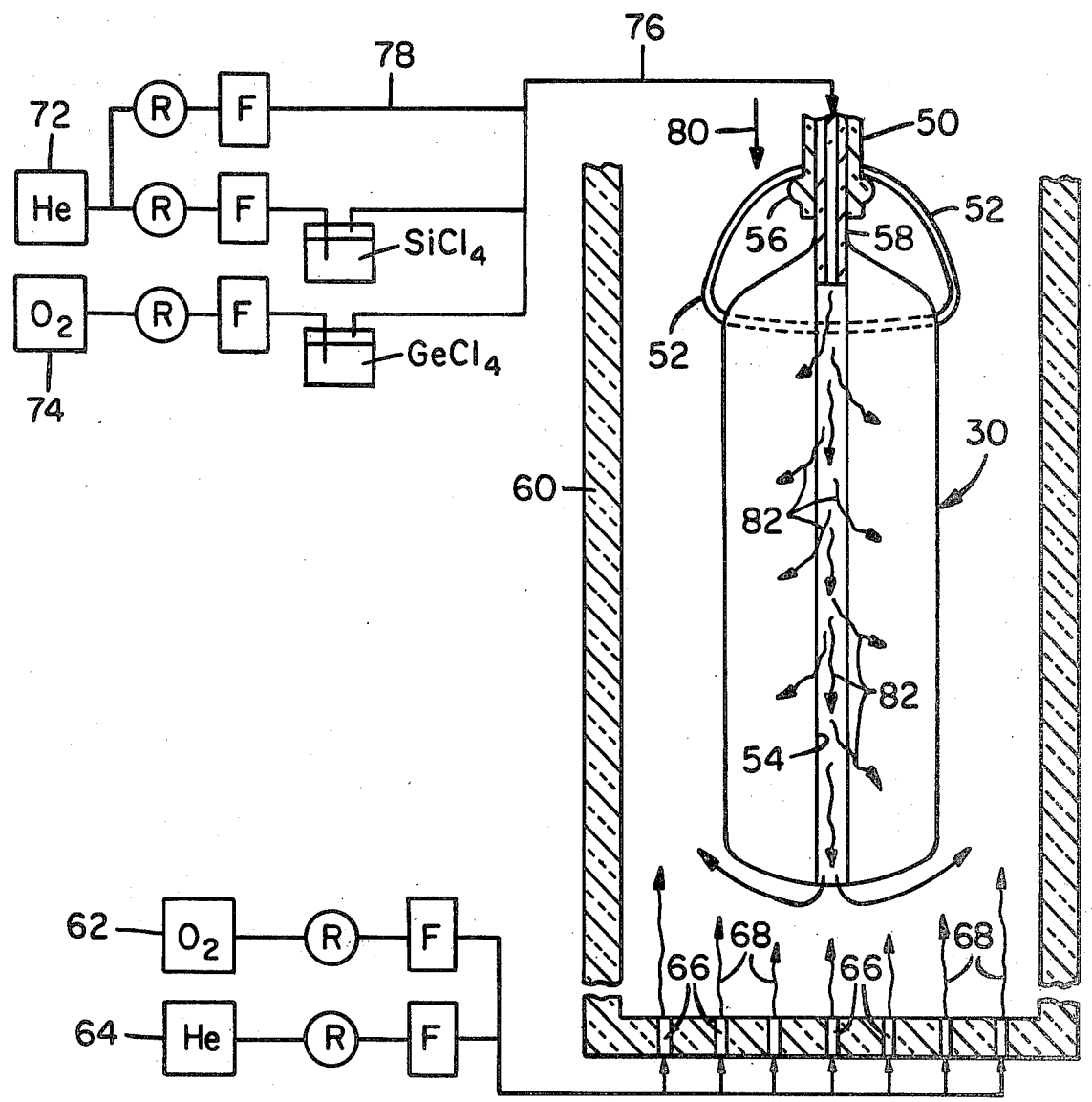
FIG. 4 is a schematic representation of a consolidation furnace and consolidation atmosphere system.

The starting member is removed from the soot preform so that a gas conducting tube can be affixed to an end of the preform. This can be accomplished by merely securing the preform while the handle is pulled therefrom. Preform 30 is then suspended from tubular support 50 as shown in FIG. 4. Two platinum wires, of which only wire 52 is shown, protrude through preform 30 on opposite sides of aperture 54 and are affixed to support 50 just above flange 56. The end of gas conducting tube 58 protrudes from tubular support 50 and into the adjacent end of preform 30. The preform is consolidated by gradually inserting it into consolidation furnace 60. It is preferred that the preform be subjected to gradient consolidation, a technique taught in the aforementioned U.S. Pat. No. 3,933,454 whereby the bottom tip of the preform begins to consolidate first, the consolidation continuing up the preform until it reaches that end thereof adjacent to tubular support 50.

In accordance with the present invention an optical waveguide preform is dried by subjecting the preform to a high purity drying agent during the consolidation process. The purity of the drying agent is maintained by preventing it from contacting the refractory walls of the consolidation furnace prior to coming into contact with the preform. The preferred method of maintaining the purity of the drying agent involves flowing a stream of an atmosphere containing the drying agent into the center of the preform and through the porous preform walls to the outside surface thereof. The resultant gases are flushed away from the blank by a gas such as helium, oxygen, argon, neon or mixtures thereof. Thus, the drying agent is unable to transport impurities from the furnace muffle to the preform. This method therefore results in an optical waveguide fiber that is essentially water free, thereby exhibiting low loss at 950 nm, and which exhibits low loss at other wavelengths as well. Examples of drying agents which may be employed are $Cl_2$, $SiCl_4$, $GeCl_4$, $BCl_3$, HCl, $POCl_3$, $PCl_3$, $TiCl_4$ and $AlCl_3$. Compounds of the other halogens such as bromine and iodine should also be effective. The particular drying agent to be employed is immaterial insofar as the drying process is concerned. However, such preform properties as refractive index, thermal coefficient of expansion and the like should be considered in the selection of the drying agent. In one embodiment of the type illustrated in FIG. 4 the drying agent was delivered to the center of the soot preform by a system comprising only glass, Teflon and a minimum amount of stainless steel, and thus, the drying agent was maintained substantially free from contamination prior to contacting the preform.

The consolidation temperature depends upon the composition of the glass soot and is in the range of 1250°-1700° C. for high silica content soot. It is also time dependent, consolidation at 1250° C. requiring a very long time. The preferred consolidation temperature for high silica content soot is between 1350° C. and 1450° C. Other glasses can be consolidated at lower temperatures, pure germania, for example, consolidating at about 900° C.

Referring again to FIG. 4 the vertical sidewalls of furnace 60 are broken to illustrate that the relative depth thereof is greater than that shown. In this figure flow regulators are schematically represented by the letter "R" within a circle and flowmeters by the letter "F" within a rectangle. Sources 62 and 64 of oxygen and helium, respectively, are connected to orifices 66 in the bottom of furnace 60. Undulated arrows 68 represent the flow of the flushing gas from the orifices. Sources 72 and 74 of helium and oxygen, respectively, are connected to containers of $SiCl_4$ and $GeCl_4$, respectively, so that helium, oxygen, $SiCl_4$ and $GeCl_4$ are present in line 76. Additional helium is coupled to line 76 by line 78.

The consolidation atmosphere system of FIG. 4 is merely representative of a number of systems which may be employed to provide the consolidation furnace and preform with appropriate gas and vapor mixtures. The flushing gas could be caused to flow from top to bottom of furnace 60. The system illustrated, whereby flushing gas flows into the bottom of furnace 60, is preferred since gas naturally tends to flow upwardly through the furnace. Also, many different arrangements may be employed to provide the desired drying gas mixture, and the present invention is not limited to the arrangement illustrated in FIG. 4. It is only necessary to provide tube 58, and ultimately preform 30, with the desired drying gas mixture, the particular means employed to achieve this mixture being immaterial.

As indicated by arrow 80, preform 30 is inserted downwardly into furnace 60. The rate of insertion is preferably low enough to permit the tip of the preform to consolidate first, the consolidation process then continuing up the preform until it reaches that end of the preform adjacent to tubular support 50. The maximum furnace temperature, which is preferably between 1350° C. and 1450° C. for high silica content soot, must be adequate to fuse the particles of glass soot and thereby consolidate the soot preform into a dense glass body in which no particle boundaries exist.

As soot preform 30 enters furnace 60 the drying gas passes through tube 58 into preform aperture 54 from which it passes into and through the interstices of the preform as indicated by arrows 82. Successful drying of the soot preform has been achieved by employing well known drying agents such as chlorine gas and $SiCl_4$. However, since the inner portion of a soot preform that is to be formed into an optical waveguide fiber contains a dopant to increase the refractive index thereof, the application of such conventional drying agents to the preform aperture where the dopant concentration is greatest causes leaching of the dopant from the preform. This results in a decrease in the refractive index of the glass at the center of the resultant optical waveguide. Although the resultant fiber functions as an optical waveguide, certain properties thereof may be adversely affected, especially in the case of graded index fibers. Therefore, the drying gas preferably contains a component that will, upon reaction in the preform, produce that dopant oxide, the concentration of which tends to be reduced by the aforementioned leaching action. The required amount of the compensating component depends upon various factors including the concentration of the dopant oxide at the center of the soot preform. It has also been found that excessive amounts of the compensating component in the drying gas can cause the formation of a thin layer of a glass rich in the dopant oxide at the inner surface of the hollow preform. This can cause breakage due to unbalanced stresses in the resulting consolidated blank. Moreover, even if a fiber can be drawn from such a blank, the refractive index at the center thereof may be excessively high due to the high concentration of dopant oxide at the fiber center. Thus, for each different waveguide composition the amount of the compensating component in the drying gas will have to be determined, determination by empirical means having been found to be satisfactory.

The excess attenuation at 950 nm for fibers drawn from untreated fibers is typically 50–100 dB/km or more. Curve 38 of FIG. 3 illustrates the attenuation vs. wavelength curve for one of the best fibers produced by this method. It has been observed that treatment in accordance with the method of the present invention also decreases the attenuation of consolidated soot blanks by nearly 1 dB/km at each of the standard measurement wavelengths of 630, 800, 820 and 1060 nm. The improvement over the prior art can be seen by comparing curve 38 of FIG. 3 with curve 34, which illustrates the loss characteristics of a waveguide fiber formed from a soot preform dried in accordance with the teachings of U.S. Pat. No. 3,933,454. The drying process of the present invention appears to either decrease the light scattering property of the glass or remove metallic impurities by forming volatile compounds thereof which are then flushed from the soot preform. Thus, in addition to providing substantial drying of a soot preform, the method of the present invention also decreases attenuation at wavelengths which are unaffected by water.

Excessive amounts of $SiCl_4$ and $GeCl_4$ tend to increase the overall attenuation of the fiber, probably either by contaminating the preform or by changing the oxidation state of impurities always in a blank. Excessive amounts of oxygen (insufficient helium) cause the blank to be seedy. Insufficient oxygen causes the attenuation of the fiber to increase because of oxidation state changes of the impurities.

The method of the present invention broadly involves flowing a gaseous drying agent through the interstices of a soot glass preform while simultaneously preventing that drying agent from contacting the walls of the furnace in which the preform is being consolidated. In the embodiment of FIG. 4 this is accomplished by flowing the drying agent into the top of the preform aperture and flushing it away with a counter-current flow of flushing gas supplied to the bottom of the furnace. The flushing gas could be supplied to the top of the consolidation furnace and thus flow in the same direction as the drying agent, means being provided at the bottom of the furnace for removing both drying and flushing gases. In another variation of the method of this invention, a laminar flow of drying agent is provided at the bottom of the furnace. As the drying gas encounters the soot preform, that gas flowing between the preform and the furnace wall acts as a buffer to prevent the gas which has contacted the wall from entering the preform. In accordance with a modification of this last mentioned embodiment, a "guard flow" of inert gas is introduced at the bottom of the furnace near the vertical wall, this "guard flow" tending to increase the shielding of the preform from impurities in the furnace refractories.

The invention will be further described with reference to specific embodiments thereof which are set forth in the following examples. In these examples, which pertain to the manufacture of optical waveguides, the inside diameter of the furnace muffle is 3¼ inches and the length thereof is 50 inches. In all examples a flushing gas mixture comprising 20 l/min helium and 500 ml/min oxygen was supplied to the bottom of the furnace as shown in FIG. 4.

EXAMPLE 1

A tubular starting member of fused quartz, approximately 0.6 cm in diameter and about 50 cm long is secured to a handle. Liquid $SiCl_4$, liquid $GeCl_4$ and $BCl_3$ are maintained at 35° C., 47° C. and 20° C. in first, second and third containers, respectively. Dry oxygen is bubbled through the first container at 2000 cc per minute and through the second container at 200 cc per minute. $BCl_3$ is metered out of the third container at 60 cc per minute. The resultant vapors entrained within the oxygen are combined and passed through a gas-oxygen flame where the vapor is hydrolyzed to form a steady stream of particles having a composition of 16% by weight $GeO_2$, 3% by weight $B_2O_3$ and 81% by weight $SiO_2$. The stream is directed to the starting member and a soot coating comprising particles of this composition is applied up to about 2.5 cm in diameter. A second coating of 86 wt.% $SiO_2$ and 14 wt.% $B_2O_3$ is then applied over the first soot coating by terminating the flow of oxygen to the liquid $GeCl_4$ and adjusting the flow of $BCl_3$ out of the third container to 300 cc per minute while maintaining the flow of oxygen through the first container at 2000 cc per minute. This cladding soot is applied until an outside diameter of approximately 5 cm is attained. The starting member is pulled from the soot preform, thereby leaving a soot preform weighing 450 g and having a diameter of 5 cm and a length of 50 cm. The drying gas tube 58 of FIG. 4 is inserted into the preform aperture which has a diameter of about 0.6 cm. Platinum wire is employed to attach the upper end of the preform to a tubular support.

The gases and vapors constituting the drying gas flow into the preform aperture at the following rates: 30 ml/min oxygen, 3 ml/min $SiCl_4$ vapor, 3.7 ml/min $GeCl_4$ vapor and 1500 ml/min helium. This mixture is obtained by maintaining the $SiCl_4$ and $GeCl_4$ at 25° and by bubbling helium through the $SiCl_4$ at 6 ml/min and oxygen through the $GeCl_4$ at 30 ml/min and flowing helium at a rate of 1.5 l/min. through bypass line 78. At 25° C. the vapor pressure of the $SiCl_4$ is about 240 Torr so that the helium picks up about 3 ml/min of $SiCl_4$ vapor, and the vapor pressure of the $GeCl_4$ is about 85 Torr so that the oxygen picks up about 3.7 ml/min of $GeCl_4$ vapor.

As the drying gas mixture flows into the preform aperture, the preform is lowered into the furnace at about 0.5 cm per min, the maximum furnace temperature being about 1380° C.

The preform is completely consolidated in about 90 min. The resultant dense glass body is withdrawn from the furnace and cooled. The resultant structure is drawn at a temperature of about 1800° C. to collapse the central hole and decrease the outside diameter thereof. Drawing is continued until the final waveguide diameter of 125 μm is achieved, the core diameter being about 62 μm. Waveguide attenuation at standard measurement wavelengths of 630, 800, 820, 900 and 1060 nm is 8.7, 3.4, 3.2, 2.7 and 1.6 dB/km, respectively. The excess absorption due to water at 950 nm is estimated to be about 17 dB/km. In this example and in some of the examples set forth in Table I below the attenuation at 950 nm is estimated by measuring the attenuation at 820 nm and 900 nm. The estimated attenuation at 950 nm is then determined by the equation $$A_{950} = 33 (A_{900} - A_{820} + 1.0)$$

There is a small spike in the refractive index profile at the center of the fiber due to the formation of a small excess of $GeO_2$ at the center of the fiber during the drying process.

The specific drying agent employed in Example 1 is effective in the drying of optical waveguides due to the occurrence of several chemical reactions. First, the $SiCl_4$ and $GeCl_4$ react with oxygen to form chlorine according to the equations:

$$SiCl_4 + O_2 \rightarrow SiO_2 + 2 Cl_2$$

$$GeCl_4 + O_2 \rightarrow GeO_2 + 2 Cl_2$$

The chlorine formed in these reactions removes hydroxyl groups from the glass according to the reactions:

$$2 \approx\!SiOH + Cl_2 \approx\!SiOSi\!\approx + 2 HCl + \tfrac{1}{2} O_2$$

where $\approx\!SiOH$ denotes that the silicon atom is connected to three other parts of the glass network.

EXAMPLES 2-10

Gas flow rates and optical waveguide attenuation values for Examples 2-10 are set forth in Table I. Each of these examples employs the same type of optical waveguide as Example 1 except Examples 5 and 6 in which graded index fibers are formed. The fibers in these two examples have the same cladding and axial compositions as the waveguide of Example 1. However, in Examples 5 and 6 the amount of $GeO_2$ gradually decreases between the fiber axis and the cladding. Also, Examples 5 and 6 employ the same soot preform consolidation process as described in Example 1 except for the drying gas mixture. Example 11 of Table I refers to an untreated fiber.

TABLE I

| Example | Gas Bubbled Through | | Helium Flow In Line 78 | Attenuation at λ in nm in dB/km | | | | | Excess absorption at 950 due to Water | Comments |
| | $SiCl_4$ | $GeCl_4$ | | 630 | 800 | 820 | 900 | 1060 | $W_{a950}$ | |
| --- | --- | --- | --- | --- | --- | --- | --- | --- | --- | --- |
| 2 | 18 ml/min $O_2$ | — | 1.25 l/min | 10.4 | 4.4 | 4.2 | 3.4 | 3.3 | 3.2 | good profile |
| 3 | 30 ml/min $O_2$ | — | 1.25 l/min | | 3.4 | 3.1 | 2.3 | 1.5 | 2.4 | small dip in profile |
| 4 | 30 ml/min $O_2$ | — | 1.25 l/min | | | 5.5 | 4.6 | 2.8 | 3* | large dip |
| 5 | 7.5 ml/min $O_2$ | — | 1.5 l/min | 10.0 | 4.9 | 4.8 | 4.8 | 3.3 | 33* | |
| 6 | — | 7 ml/min $O_2$ | 1.5 l/min | 11.1 | 4.4 | 4.1 | 3.3 | 2.6 | 1 | profile slightly affected, blank broke partly |
| 7 | 6 ml/min $O_2$ | 8 ml/min He | 1.5 l/min | 8.4 | 3.4 | 3.2 | 2.7 | 1.7 | 12* | small dip in profile |
| 8 | 6 ml/min $O_2$ | 19 ml/min He | 1.5 l/min | — | — | 3.4 | 3.0 | 1.9 | 20* | small dip in profile |
| 9 | 6 ml/min $O_2$ | 30 ml/min He | 1.5 l/min | 8.1 | 3.0 | 2.8 | 2.4 | 1.3 | 8* | large dip in profile |
| 10 | (a) | | 1.5 l/min | 10.1 | 6.6 | 6.5 | 6.0 | 4.8 | 0.3 | large dip in profile |
| 11 | (b) | | | 9.2 | 4.3 | 4.1 | 8.2 | 2.9 | 160 | — |

*Estimated
(a) drying gas comprises only 20 ml/min $Cl_2$ in addition to the 1.5 l/min He
(b) no drying gas employed during consolidation It is to be noted that attenuation curve 38 of FIG. 3 pertains to the optical waveguide formed in accordance with Example 6.

As indicated hereinabove a balance of $SiCl_4$ and $GeCl_4$ is required in the drying and consolidation of germania doped optical waveguides to prevent distortion of the refractive index profiles thereof. An excess of $SiCl_4$, for example, is believed to cause leaching of $GeO_2$ from the soot preform according to the reactions:

$$SiCl_4 + O_2 \rightarrow SiO_2 + Cl_2$$
$$Cl_2 + GeO_2 \text{ (glass)} \rightarrow GeOCl_2 \text{ or } GeCl_4 \text{ or other volatile germaniym products}$$
or
$$SiCl_4 + GeO_2 \text{ (glass)} \rightarrow SiO_2 \text{ (glass)} + GeCl_4$$

On the other hand, excessive amounts of $GeCl_4$ cause a deposition of a thin layer (50–100 μm thick) of a glass rich in $GeO_2$. This thin layer of glass has a higher expansion than the bulk of the blank. On cooling of the blank, this layer goes into tension and often causes blank breakage because of unbalanced stresses. For example, several blanks were dried during consolidation by applying to the preform aperture a gas-vapor mixture obtained by bubbling about 8 ml/min oxygen through $GeCl_4$ at 25° C. and mixing the resultant oxygen-vapor mixture with 1.5 l/min helium. Most of the resultant optical waveguide blanks broke because of the high stress introduced therein during the drying process. Without special care, such breakage approaches 80%. If the blank is not cooled between the consolidation process and the process of drawing the resultant blank into a fiber, breakage is not a problem, but this technique is very inconvenient.

The amount of water remaining in the consolidated blank is a function of the amount of water initially present in the soot preform. This variable can be eliminated by controlling the humidity of the atmosphere to which the soot preform is subjected from the time of soot deposition until the consolidation is completed. Then, by varying the amount of chlorine or other drying agent present in the atmosphere flowing from tube 58 to preform aperture 54, the amount of water removal can be controlled. Also, by controlling the amount of dopant in such atmosphere, the adverse effect of the drying process on the refractive index profile of the resultant optical waveguide fiber can be minimized.

I claim:

1. In the method of forming a glass article comprising the steps of
   depositing on a starting member a coating of flame hydrolysis-produced glass soot particles to form a porous soot preform, and
   consolidating said soot preform to form a dense glass layer free from particle boundaries,
   said consolidation step being characterized in that it comprises
   removing said starting member to form an aperture in said soot preform,
   disposing said preform in a furnace wherein it is subjected to a temperature within the consolidation temperature range for a time sufficient to cause said soot particles to fuse and form a dense glass layer, and
   flowing a stream of an atmosphere containing a drying agent through the interstices of said porous soot preform while preventing that portion of said stream which contacts said preform from previously contacting said furnace, wherein the step of flowing comprises flowing said stream into said aperture so that at least a portion of said stream flows outwardly from the center of said preform through the interstices therein to the outer surface thereof.

2. The method of claim 1 wherein said drying agent comprises chlorine.

3. The method of claim 1 wherein the inner portion of said soot preform comprises glass particles doped with a material which increases the refractive index thereof to a value greater than that of the soot particles of the outer portion of said preform, and wherein said stream comprises a component which reacts during said consolidation step to form said dopant material.

4. The method of forming a glass article comprising the steps of
   depositing on a starting member a coating of flame hydrolysis-produced glass soot to form a porous soot preform,
   removing said starting member to form an aperture in said preform,
   heating said soot preform to a temperature within the consolidation temperature range for a time sufficient to cause said soot particles to fuse and form a dense glass layer, and
   flowing into said aperture a stream of an atmosphere containing a drying agent, at least a portion of said stream flowing outwardly from the center of said preform through the interstices therein to the outer surface thereof.

5. The method of claim 4 wherein said atmosphere continues to flow into said aperture until said soot preform is completely consolidated.

6. The method of claim 5 wherein said drying agent comprises chlorine.

7. The method of claim 5 wherein the inner portion of said soot preform comprises glass particles doped with a material which increases the refractive index thereof to a value greater than that of the soot particles at the outer portion of said preform, and wherein said stream comprises a component which reacts during said consolidation step to form said dopant material.

8. The method of claim 5 wherein the step of depositing comprises depositing on said starting member a coating of flame hydrolysis-produced glass soot comprising $SiO_2$ and an amount of a dopant oxide to increase the refractive index of said glass soot particles to a value greater than that of $SiO_2$ alone, and depositing on said first coating at least one additional coating of glass soot particles having refractive index lower than that of the particles of said first coating, and wherein said stream comprises a component which reacts during said consolidation step to form $SiO_2$ and a component which reacts to form said dopant oxide and wherein said method further comprises the step of drawing the resultant dense glass body to form an optical fiber.

9. The method of claim 8 wherein the refractive index of said first coating is constant throughout the radius thereof.

10. The method of claim 8 wherein the refractive index of said first coating decreases with increasing radius.

11. The method of claim 8 wherein said drying agent is selected from the group consisting of $Cl_2$, $SiCl_4$, $GeCl_4$, $POCl_3$, $PCl_3$, $AlCl_3$, $BCl_3$, $TiCl_4$, $Br_2$, $I_2$ and mixtures thereof.

12. The method of claim 5 further comprising the step of flowing a flushing gas over the outside surface of said preform to remove said stream as it emerges from said surface.

13. The method of forming a glass article comprising the steps of
   depositing on a starting member a coating of flame hydrolysis-produced glass soot to form a porous soot preform,
   removing said starting member to form an aperture in said preform,
   disposing said preform in a furnace,
   heating said soot preform to a temperature within the consolidation temperature range for a time sufficient to cause said soot particles to fuse and form a dense glass layer, and
   flowing into said aperture a stream of chlorine-containing atmosphere, at least a portion of said stream flowing outwardly from the center of said preform through the interstices therein to the outer surface thereof, and
   flowing a gas through said furnace to flush said stream from said furnace as it emerges from said surface.

14. The method of claim 13 wherein the inner portion of said soot preform comprises glass particles doped with a material which increases the refractive index thereof to a value greater than that of the soot particles at the outer portion of said preform, and wherein said stream comprises a component which reacts during said consolidation step to form said dopant material.

15. The method of claim 13 wherein the step of depositing comprises depositing on said starting member a coating of flame hydrolysis-produced glass soot comprising $SiO_2$ and an amount of a dopant oxide to increase the refractive index of said glass soot particles to a value greater than that of $SiO_2$ alone, and depositing on said first coating at least one additional coating of glass soot particles having refractive index lower than that of the particles of said first coating, and wherein said stream comprises a component which reacts during said consolidation step to form $SiO_2$ and a component which reacts to form said dopant oxide and wherein said method further comprises the step of drawing the resultant dense glass body to form an optical fiber.

* * * * *